United States Patent
Hong

[11] Patent Number: 6,005,686
[45] Date of Patent: Dec. 21, 1999

[54] SUPPORTING MECHANISM FOR A SCANNING MODULE

[75] Inventor: Tsan Yao Hong, Taipei, Taiwan

[73] Assignee: Acer Peripherals, Inc., Taiwan

[21] Appl. No.: 09/056,006

[22] Filed: Apr. 6, 1998

[30] Foreign Application Priority Data

Dec. 5, 1997 [TW] Taiwan ................................. 86220277

[51] Int. Cl.⁶ ..................................................... H04N 1/04
[52] U.S. Cl. ......................... 358/497; 358/474; 358/494; 399/211
[58] Field of Search .................................. 358/474, 482, 358/483, 494, 496, 497, 498; 399/206, 211; 355/75, 18

[56] References Cited

U.S. PATENT DOCUMENTS

| | | | |
|---|---|---|---|
| 5,504,586 | 4/1996 | Garcia et al. ............................ | 358/496 |
| 5,610,731 | 3/1997 | Itoh . | |
| 5,734,483 | 3/1998 | Itoh ......................................... | 358/496 |
| 5,801,851 | 9/1998 | Sheng ...................................... | 358/497 |
| 5,857,133 | 1/1999 | Sun ......................................... | 358/497 |
| 5,878,319 | 3/1999 | Itoh ......................................... | 358/496 |
| 5,900,951 | 5/1999 | Tsai ......................................... | 358/497 |

Primary Examiner—Alan A. Mathews
Attorney, Agent, or Firm—Fulbright & Jaworski L.L.P.

[57] ABSTRACT

A supporting mechanism for scanning module comprises a supporting bracket for mounting a scanning module thereof Two end portions of the top surface of the supporting bracket are provided with a roller respectively. When the supporting bracket moves longitudinally, the rollers rolls along a bottom surface of a glass plate when a biasing force is exerted to the supporting bracket. The supporting mechanism further includes a biasing device moveably supported by a supporting runway at one end. The biasing device provides a horizontal and a vertical biasing force to the supporting bracket respectively. The supporting bracket is in close contact with a longitudinal reference surface due to the horizontal biasing force exerted thereon as the supporting bracket moves longitudinally. The clearance between the scanning module and the bottom surface of the glass plate is kept substantial constant by the vertical biasing force exerted to the supporting bracket when it moves longitudinally.

15 Claims, 5 Drawing Sheets

6,005,686

SUPPORTING MECHANISM FOR A SCANNING MODULE

FIELD OF THE INVENTION

The present invention relates to a supporting mechanism of the scanning module within a scanning apparatus.

DESCRIPTION OF PRIOR ART

As shown in FIG. 3, the scanning module of a conventional scanner generally includes a supporting bracket 20a defining a space for receiving a scanning module (no shown) therein. The supporting bracket 20a is moveably supported by means of a guiding rod 10a through a bushing 21a. The scanning module is generally fixedly disposed within the space of the supporting bracket 20a either by means of pressed-fit or threaded engagement. Accordingly, the dimension inaccuracy associated with the movement of the supporting bracket 20a affects the relative relationship between the scanning module and the document to be scanned. The guiding rod 10a is fixedly disposed on the housing (not shown) of the scanner. The supporting bracket 20a further includes a roller (not shown) which is disposed at the end opposite to that of the bushing 21a and moves along a supporting runway of the housing. Within the housing, there is provided a driving mechanism 30a that includes a driving motor 31a and a belt 32a. When the driving motor 31a rotates clockwise or counterclockwise responsive to an instruction, the supporting bracket 20a performs a scanning operation within a specified range. A supporting glass plate (not shown) is disposed above the housing for supporting the document to be scanned. When the scanning module below the glass plate moves across the document, the information on the document can be readily input and converted by a sensing device, such as a CIS or CCD. Since the CIS has a shorter focal distance, the compactness requirement may be achieved readily by a flatbed scanner incorporating the CIS type sensors. However, the CIS scanner only tolerates a smaller inaccuracy, the accuracy requirement to the CIS flatbed scanner is inevitably higher.

Furthermore, the light traveling distances, which is a distance between each image on the document and the sensing device, for each scan-line operations are varied due to the following errors which will deteriorate the quality of the image obtained. The reason for those errors are discussed below.

1) Error of the glass plate per se. The manufacturing error of the glass plate is about 0.5 mm to 1.5 mm. This manufacturing error is beyond the control of the maker of the scanner.

2) Error resulting from the poor levelism of the supporting apparatus of the scanning module. In an ideal condition, the plane defined by the linear movement of the scanning module while moving along the guiding rod is parallel to the plane defined by the lower surface of the glass plate. However, during the manufacturing process, the levelism of the guiding rod as well as the supporting runway affect the levelism of the scanning module respectively. At the stage of the guiding rod being attached to the housing, if the longitudinal axis of the guiding rod is not accurately parallel to the lower surface of the glass plate, the scanning module will not be always parallel to the lower surface of the glass plate as expected during the movement. Same parallel argument is true for the supporting runway. Once the glass plate is mounted onto the housing following the guiding rod and scanning module being mounted, it is impossible to conduct an alignment procedure with respect to the guiding rod or scanning module any more.

3) Error resulting from variable clearance between the supporting bracket and the lower surface of glass plate. Ideally, the clearance between the supporting bracket and the lower surface of the glass plate is a constant value. However, since the scanning module is moveably supported on the guiding rod and the glass plate is inherited with manufacturing errors, the clearance becomes a non-constant value.

In the conventional flatbed scanner, the reference plane is either the guiding rod or the supporting runway, and the scanning module and the glass plate are aligned with respect to the guiding rod or the supporting runway respectively. As a result, the manufacturing error of the glass plate itself, the variable clearance between the scanning module and the glass plate, and the parallelism between the scanning module and the glass plate, all affect the light traveling distance which decides the final image obtained. In summary, the above mentioned errors are resulted from the choice of the reference plane or reference line. In order to diminish those errors, complicate and accurate tooling/moldings are required. Therefore, not only the manufacturing cost, but also the assembling work-load are increased.

Besides, as the scanning module is driven longitudinally along the housing of the scanner, in order to prevent the minor spin, i.e. angular deviation, in respect to the scanning module, two approaches are generally taken. One is the bushing/guiding rod arrangement as shown in FIG. 3 which prevents the spin possibility as the scanning module moves along the guiding rod. The other way is to drive the scanning module by a parallel mechanism configured by cable/pulley which is disclosed in the NEC AS6E scanner. Nevertheless, the cable/pulleys arrangement is quite complicated in assembling and the associated cost becomes considerably high. Furthermore, the image will be deteriorated due to the fact that the cable/pulley arrangement has a poor shock-resistance.

SUMMARY OF THE INVENTION

It is the objective of this invention to provide a supporting mechanism for scanning module wherein the lower surface of the glass plate is used as the reference plane. Accordingly, the manufacturing error of glass plate can be neglected.

The supporting mechanism for scanning module, according to the present invention, generally comprises a supporting bracket for mounting the scanning module thereof Each end of the supporting bracket is provided with a roller. When the supporting bracket moves longitudinally along the housing of the scanner and is exerted with a biasing force, the rollers roll over the lower surface of the glass plate. The supporting mechanism further includes a biasing device and one end of the biasing device is moveably supported on a supporting runway. The biasing device exerts a horizontal and/or a vertical biasing forces to the supporting bracket respectively. When the supporting bracket is moved longitudinally, the supporting bracket constantly contacts with a longitudinal reference surface by the horizontal biasing force. And at the same time, the supporting bracket is spaced from the lower surface of the glass plate by a substantial constant value by the vertical biasing force.

DETAILED DESCRIPTION OF PREFERRED EMBODIMENT

Figure 1:
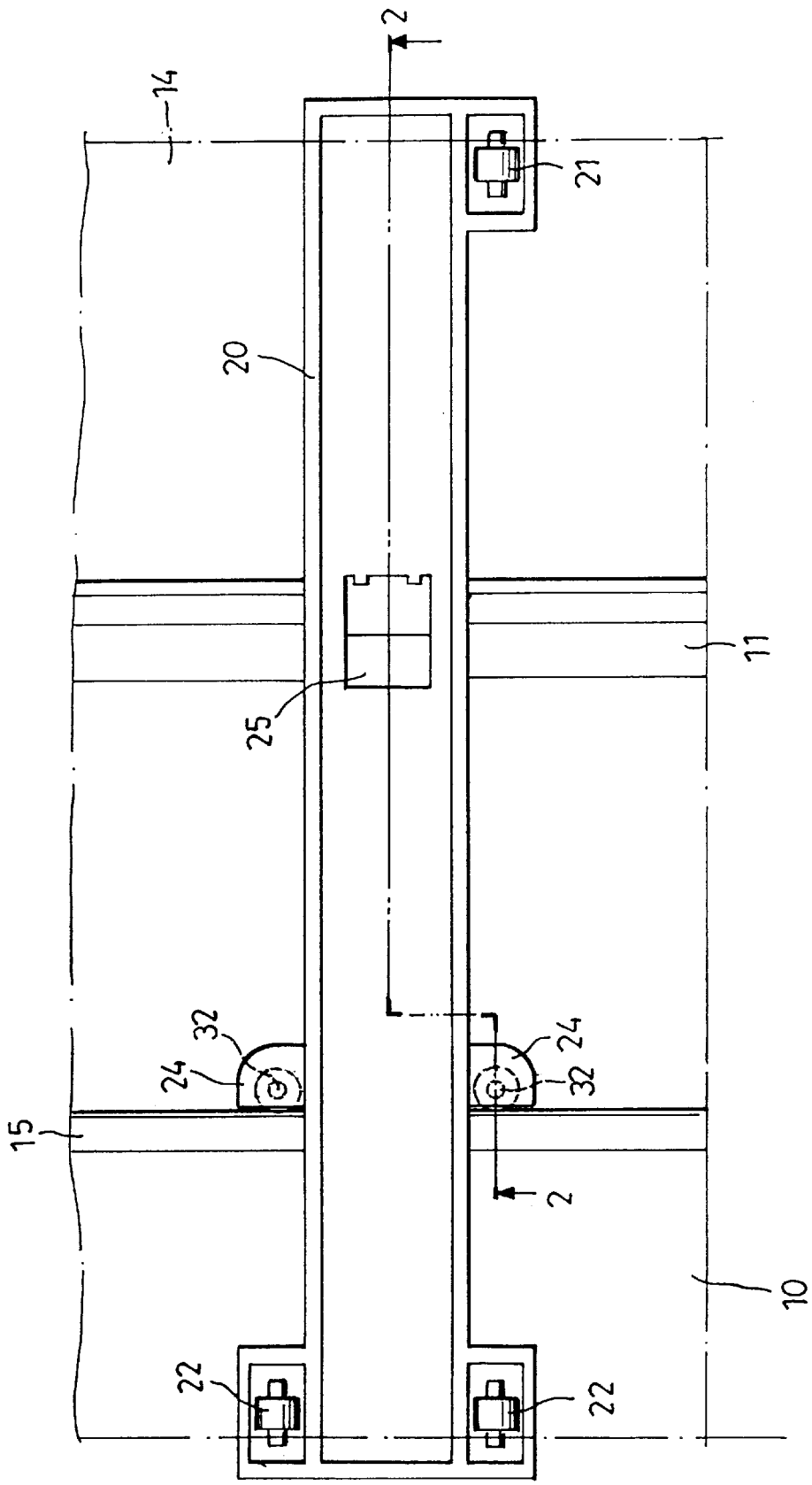
FIG. 1 is a top plan view showing the relationship between the scanning module 20, longitudinal reference element 15 and the longitudinal supporting runway of the present invention.
Figure 2:
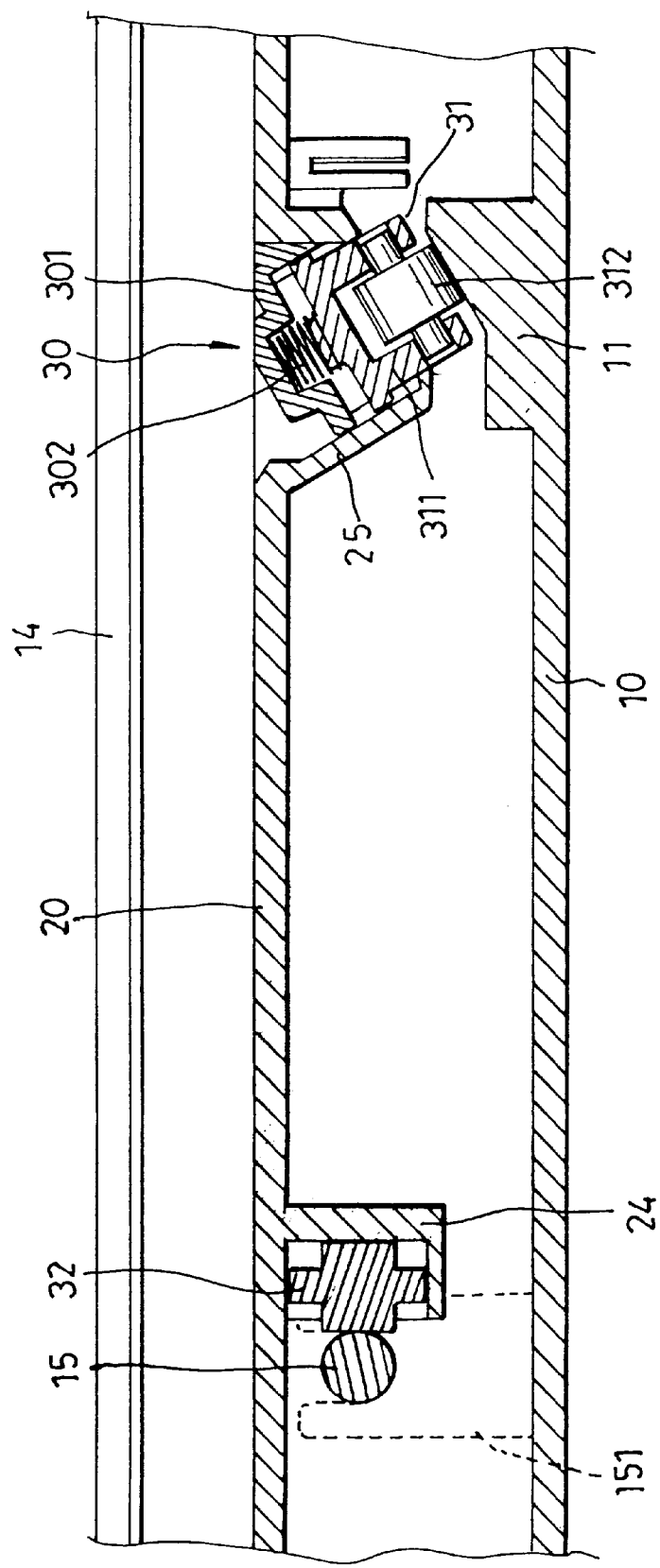
FIG. 2 is a cross sectional view taken along the line 2—2 in FIG. 1.
Figure 3:
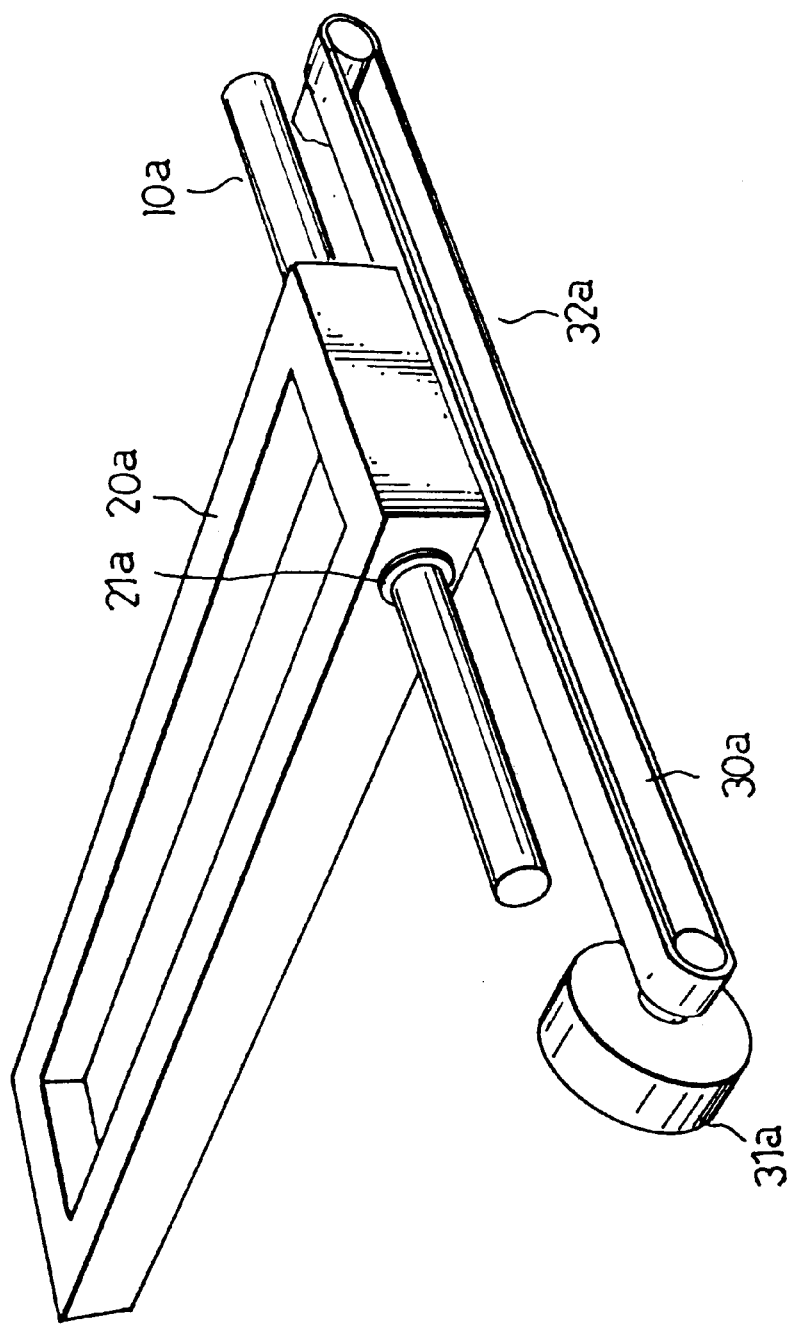
FIG. 3 is a schematic illustration showing the arrangements of the scanning module, guiding rod and driving, apparatus of the conventional flatbed scanner.

Referring to FIG. 1, the flatbed scanner made according to the present invention generally includes a supporting bracket 20 that defines a receiving space for mounting a scanning module (not shown) therein. When the supporting bracket 20 is driven, the scanning process can be proceeded. A first receiving space defined by an extended casing 24 at the underside of the supporting bracket 20 is used to mount a roller device 32. Referring to FIG. 2, a second receiving space defined by an extended casing 25, that is distant to the first extended casing 24, is used to receive a biasing device 30. The roller device 32 movably contacts with a longitudinal reference element 15. Accordingly, even there is an error with regard to the longitudinal supporting runway 11, due to existence of the roller device 32 and the horizontal biasing force exerted by a resilient element 302 of the biasing device 30, the spin phenomenon of the supporting bracket 20 during its longitudinal movement, i.e. the vertical direction in FIG. 1, will be effectively prevented. As a result, the drawback existed in the conventional technique is solved. The relationship between the biasing device 30 and the longitudinal supporting runway 11 will be described in detail as follows. Furthermore, the top end portions of the supporting bracket 30 are provided with rollers 21, 22 respectively. During the linear movement of the supporting bracket 20 along the longitudinal direction of the scanner apparatus, the rollers 21, 22 roll over the lower surface of the glass plate 14.

Referring to FIG. 2, the scanner includes a housing 10 that defines an opening for mounting the glass plate 14. The supporting bracket 20 defines a receiving space for mounting the scanning module (not shown) therein. The housing 10 further includes a longitudinal supporting runway 11 corresponding to the extended casing 25. The biasing device 30 provided by the present invention is disposed within a second space defined by the extended casing 25. One end of the biasing device 30 includes a roller 312 sitting on and rolling on the supporting runway 11 during operation. As a result, a vertical biasing force will be exerted to the supporting bracket 20. Since the vertical biasing force can be automatically adjusted due to the existence of the resilient element 302 of the biasing device 30, a substantial constant clearance between the scanning module and the glass plate 14 is sustained. In the shown preferred embodiment, the supporting runway 11 is an inclined surface and the roller 312 of the biasing device 30 is vertically disposed on this inclined surface. As a result, a vertical and a horizontal biasing force will be simultaneously applied to the supporting bracket 20. In the preferred embodiment, the biasing device 30 includes a casing 301, a supporting socket 311 and a resilient element 302. The supporting socket 311 is slidably received within the casing 301 such that a variable inner space within the casing 301 is defined. The resilient element 302 is disposed within the variable inner space of the casing 301. The roller 312 is rotationally attached to the supporting socket 311. When those components are assembled, the casing 301 is fixedly attached to the supporting bracket 20.

When the supporting bracket 20 moved along longitudinally with the roller 312 rolling on the supporting runway 11 of the housing 10, a constant clearance between the supporting bracket 20 and the transparent plate 14 is sustained by adjustment of the resilient element 302 with respect to the supporting runway 11. In an alternative embodiment, the roller 312 can be readily substituted by other equivalent element, for example a smooth surface coating with a TEFLON material to reduce the friction.

In other words, as the lower surface of the glass plate 14 is selected as the reference plane, the supporting bracket 20 is pushed upward by the resilient element 302 and spaced with the glass plate 14 by a substantial constant clearance. As a result, the light traveling distance during the scanning process remains unchanged. The quality of the image is controlled in stable and high level.

In the preferred embodiment of the present invention, the housing 10 further includes a longitudinal guiding element 15 acting as a longitudinal reference element. The longitudinal guiding element 15 shown in FIG. 2 is cylinder rod. Both ends of the guiding element 15 are supported by a mounting socket 151 respectively. In an alternative, the guiding element 15 can be a guiding surface. As shown in FIG. 1, the longitudinal guiding element 15 is parallel to the supporting runway 11. When the supporting bracket 20 moves longitudinally, the roller device 32 moveably contacts with the longitudinal guiding element 15 and is guided by the longitudinal guiding element 15. The roller device 32 is in rolling contact with the guiding element 15. Based on this design, the dimension variation, i.e. error, of the guiding element 15 along its longitudinal direction, if any, will not affect the parallelism of the supporting bracket 20 with respect to the glass plate 14 as the supporting bracket 20 moves. By this arrangement, the drawback associating with the prior arts is substantially solved. Furthermore, the present invention allows larger dimension error along the longitudinal direction of the guiding element 15. Accordingly, the accuracy and tolerance required by the guiding element 15 during the manufacturing and assembling processes can be lowered. The manufacturing cost can be lowered accordingly. As shown in FIG. 1, the roller device 32 is received within a first space defined by the extended casing 24. Even there is an error on the longitudinal supporting runway 11, with the provision of the roller device 32 and automatic adjustment capability of the horizontal biasing force provided by the resilient element 302, the spin of the supporting bracket 20 during its linear movement within the housing 10 can be substantially eliminated. The problem encountered by the conventional scanner is substantially solved by the provision of the present invention.

In the preferable embodiment of the present invention, the roller device 32 touches on the guiding rod 15. However, there are other alternatives under the spirit of the invention. For example, when the guiding element 15 is embodied by a guiding surface or wall instead, the roller device 32 can be embodied by a steel ball accordingly. This alternative arrangement may also prevent the spin of the supporting bracket 20 during its linear movement.

Referring to FIG. 2, the roller device 32 and the biasing device 30 is distant from each other for clarity purpose. In practice, the distance between the biasing device 30 and the roller device 32 can be shortened to attain a better result.

Figure 4:
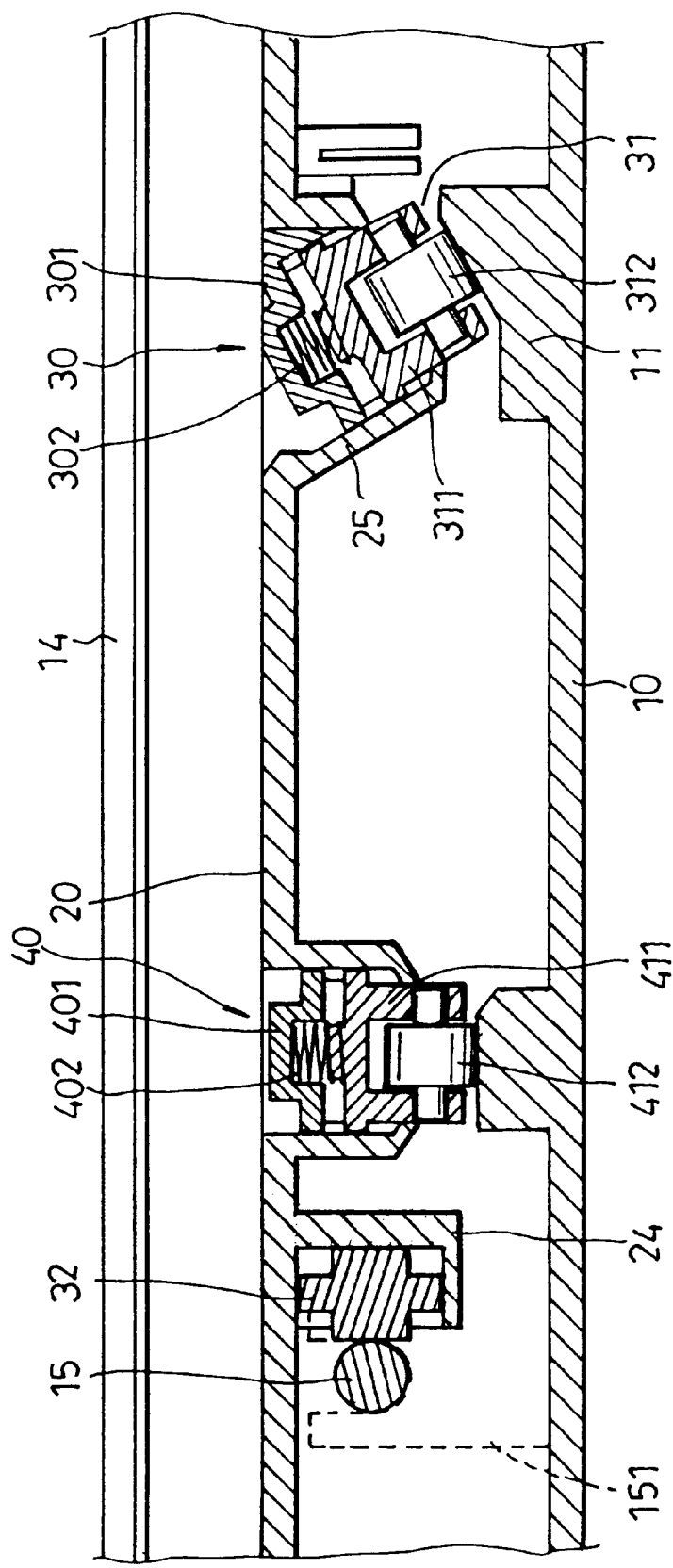
FIG. 4 is a second embodiment of the supporting bracket of the present invention.

Alternatively, one biasing device 40 is further disposed between the biasing device 30 and the roller device 32 with its location more proximate to the roller device 32. The biasing device 40 rolls on a horizontal runway as shown. As shown in FIG. 4, the biasing device 40 provides an additional vertical biasing force toward the supporting bracket 20 other than the biasing device 30. With the cooperation of the biasing device 30 and the biasing device 40, an optimal levelism of the supporting bracket 20 during the linear movement is ensured such that a substantial constant clearance between the supporting bracket 20 and the glass plate 14 is sustained. The biasing device 40 is identical to the biasing device 30 and detailed description can be found in the corresponding description above. Similar to the supporting socket 311, the supporting socket 411 in FIG. 4 is slidably received within the casing 401 such that a variable inner space within the casing 401 is defined. Similar to the resilient element 302, the resilient element 402 In FIG. 4 is disposed within the variable inner space of the casing 401. Similar to the roller 312, the roller 412 in FIG. 4 sits on and rolls on the shown supporting runway during operation.

Figure 5:
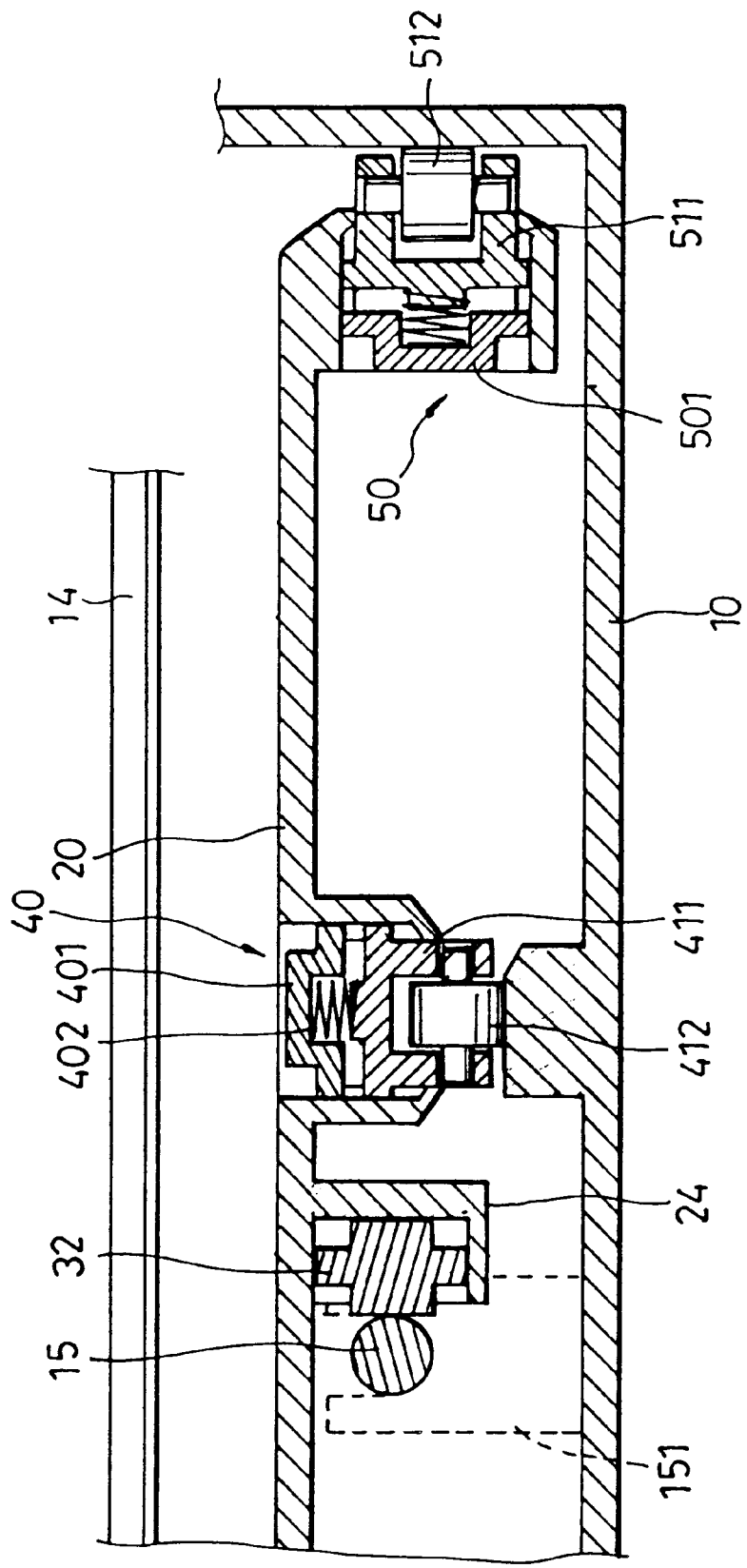
FIG. 5 is a third embodiment of the supporting bracket of the present invention.

Alternatively, as shown in FIG. 5, a first biasing device 40 and a second biasing device 50 are provided to fulfill the function of the biasing device 30 shown in FIG. 2. The first biasing device 40 sits on and rolls over a horizontal runway to provide a vertical biasing force toward the supporting bracket 20. Accordingly, a better levelism is attained during the linear movement of the supporting bracket 20. As a result, a substantial constant clearance between the supporting bracket 20 and the glass plate 14 is sustained during operation of the scanner. The biasing device 40 is identical to the biasing device 30 and the detailed description is given above. The second biasing device 50 contacts with and rolls over a vertical runway to provide a horizontal biasing force toward the supporting bracket 20. In a preferable embodiment, this vertical runway is embodied by the inner sidewall of the housing 10. Based on this design, the dimension variation of the guiding element 15 along its longitudinal direction, the error associating with the inner sidewall of the housing 10 will not affect the parallelism of the supporting bracket 20 with respect to the glass plate 14 during the linear movement of the supporting bracket 20. The biasing device 50 is identical to the biasing device 30. Similar to the supporting socket 311, the supporting socket 511 in FIG. 5 is slidably received within the casing 501 such that a variable inner space within the casing 501 is defined. Similar to the resilient clement 302, the resilient element (not labeled) in FIG. 5 is disposed within the variable inner space of the casing 501. Similar to the roller 312, the roller 512 in FIG. 4 sits on and rolls on the shown inner wall of the housing 10 during operation.

In an alternative, the supporting runway 11, horizontal runway may be integrally formed with the housing 10.

I claim:

1. A supporting apparatus for a scanning module of the type that is mounted within a receiving space of a housing, said housing being provided with a longitudinal supporting runway at a predetermined position, said housing including an opening defining a peripheral for mounting a transparent plate thereof, comprising:

a supporting bracket for mounting said scanning module; and a first biasing device moveably supported by said longitudinal supporting runway, said first biasing device providing a horizontal and vertical biasing force toward said supporting bracket, wherein said supporting bracket is closely in contact with a longitudinal reference surface by said horizontal biasing force as said supporting bracket moves longitudinally, and wherein a substantial constant clearance between said scanning module and a lower surface of said transparent plate is sustained by said vertical biasing force as said supporting bracket moves longitudinally.

2. A supporting apparatus as recited in claim 1, wherein said longitudinal reference surface comprises a longitudinal guiding rod fixedly disposed within said housing, said supporting bracket providing a first receiving space for mounting a roller device therein, wherein, as said supporting bracket moves longitudinally, said horizontal biasing force renders a rolling contact relationship between said roller device and said guiding rod.

3. A supporting apparatus as recited in claim 1, wherein said supporting runway includes an inclined surface, and said first biasing device is disposed perpendicularly to said inclined surface.

4. A supporting apparatus as recited in claim 1, wherein said first biasing devices includes a casing, a supporting socket, a resilient element and a roller, said supporting socket being slidably received within said casing such that a variable inner space within said casing is defined, said resilient element being disposed within said variable inner space of said casing, said roller being rotationally attached to said supporting socket, wherein, as said roller moves along said supporting runway, the constant clearance between said supporting bracket and said transparent plate is sustained by adjustment of said resilient element with respect to said supporting runway.

5. A supporting apparatus as recited in claim 1, wherein two end portions of a top surface of said supporting bracket are respectively provided with a roller, and, as said supporting bracket moves longitudinally, said vertical biasing force renders said rollers in rolling contact with said transparent plate.

6. A supporting apparatus as recited in claim 1, wherein said longitudinal reference is located at a bottom surface of said housing.

7. A supporting apparatus as recited in claim 6, wherein said supporting runway is integrally formed with said housing.

8. A supporting apparatus as recited in claim 1, wherein said supporting bracket further comprises a second biasing device for providing a second vertical biasing force.

9. A supporting apparatus as recited in claim 8, wherein said second biasing devices includes a casing, a supporting socket, a resilient element and a roller, said supporting socket being slidably received within said casing such that a variable inner space within said casing is defined, said resilient element being disposed within said variable inner space of said casing, said roller being rotationally attached to said supporting socket, wherein, as said roller moves along a second supporting runway, the constant clearance between said supporting bracket and said transparent plate is sustained by adjustment of said resilient element with respect to said second supporting runway.

10. A supporting apparatus for a scanning module of the type that is mounted within a receiving space of a housing, said housing being provided with a longitudinal horizontal runway, a longitudinal reference surface and a vertical runway, said housing being provided with a transparent plate, said supporting apparatus comprising:

a supporting bracket for mounting said scanning module;

a first biasing device moveably supported by said longitudinal horizontal runway, said first biasing device providing a vertical biasing force toward said supporting bracket, wherein, as said supporting bracket moves longitudinally, a substantial constant clearance between said supporting bracket and said transparent plate is sustained by said vertical biasing force; and a second biasing device moveably supported by said vertical runway, said second biasing device providing a horizontal biasing force toward said supporting bracket such that, as said supporting bracket moves longitudinally, said supporting bracket is closely in contact with said longitudinal reference surface.

11. A supporting apparatus as recited in claim 10, wherein said second biasing devices includes a casing, a supporting socket, a resilient element and a roller, said supporting socket being slidably received within said casing such that a variable inner space within said casing is defined, said resilient element being disposed within said variable inner space of said casing, said roller being rotationally attached to said supporting socket, wherein, as said roller moves along said vertical runway, by adjustment of said second biasing device responsive to an error of the vertical runway with respect to the longitudinal reference surface, said supporting bracket keeps in close contact with said longitudinal reference surface.

12. A supporting apparatus as recited in claim 10, wherein two end portions of the top surface of said supporting bracket are respectively provided with a roller, and, as said supporting bracket moves longitudinally, said vertical biasing force renders said rollers in rolling contact with said transparent plate.

13. A supporting apparatus as recited in claim 10, wherein said longitudinal reference surface comprises a longitudinal guiding rod fixedly disposed within said housing, said supporting bracket providing a first receiving space for mounting a roller device therein, wherein, as said supporting bracket moves longitudinally, said horizontal biasing force renders a rolling contact relationship between said roller device and said guiding rod.

14. A supporting apparatus as recited in claim 10, wherein said vertical runway is defined by an inner sidewall of said housing.

15. A supporting apparatus as recited in claim 13, wherein said horizontal runway is integrally formed with said housing.

* * * * *